(12) United States Patent
Goldman et al.

(10) Patent No.: US 9,424,083 B2
(45) Date of Patent: Aug. 23, 2016

(54) MANAGING METADATA FOR A DISTRIBUTED PROCESSING SYSTEM WITH MANAGER AGENTS AND WORKER AGENTS

(71) Applicant: Google Inc., Mountain View, CA (US)

(72) Inventors: Kenneth J. Goldman, Palo Alto, CA (US); Sunghwan Ihm, Sunnyvale, CA (US); Xiaozhou Li, Cupertino, CA (US); Jelena Pjesivac-Grbovic, Mountain View, CA (US)

(73) Assignee: Google Inc., Mountain View, CA (US)

( * ) Notice: Subject to any disclaimer, the term of this patent is extended or adjusted under 35 U.S.C. 154(b) by 273 days.

(21) Appl. No.: 14/211,660

(22) Filed: Mar. 14, 2014

(65) Prior Publication Data

US 2015/0261570 A1    Sep. 17, 2015

(51) Int. Cl.
G06F 9/46        (2006.01)
G06F 9/48        (2006.01)
G06F 9/50        (2006.01)
G06F 9/54        (2006.01)

(52) U.S. Cl.
CPC .............. G06F 9/4881 (2013.01); G06F 9/50 (2013.01); *G06F 9/542* (2013.01)

(58) Field of Classification Search
None
See application file for complete search history.

(56) References Cited

U.S. PATENT DOCUMENTS 7,707,163 B2   4/2010  Anzalone
8,577,842 B1   11/2013 Nagargadde 2005/0071486 A1   3/2005  Vu et al.
2006/0143275 A1*  6/2006  Stephens ............... H04L 67/26
                                                    709/206
2007/0112779 A1   5/2007  Gargi

OTHER PUBLICATIONS

"Chapter 8. Hadoop Distributed File System (HDFS)—Introduction," [online][Retrieved on Mar. 13, 2014]; Retrieved from the Internet URL: http://hadoopilluminated.com/hadoop_illuminated/HDFS_Intro.html, 9 pages.
Dean et al., "MapReduce: Simplified Data Processing on Large Clusters," [online][Retrieved on Mar. 13, 2014]; Retrieved from the Internet URL: http://static.googleusercontent.com/media/research.google.com/en/us/archive/mapreduce-osdi04.pdf, to appear in OSDI 2004, 13 pages.
International Search Report and Written Opinion in International Application No. PCT/US2015/018691, mailed Jun. 25, 2015, 10 pages.

* cited by examiner

*Primary Examiner* — Wissam Rashid
(74) *Attorney, Agent, or Firm* — Fish & Richardson P.C.

(57) ABSTRACT

Methods, systems, and apparatus are described for managing metadata for a distributed processing system. In one aspect, a method includes receiving a computation specification that includes a set of grains that specifies an initial state for a computation that is to be performed by a distributed processing system, wherein each grain comprises metadata that specifies a portion of the initial state for the computation; storing a grain hierarchy that represents a state for the computation based on a grain type associated with each grain, the grain hierarchy comprising subscription grains for subscriptions for the grain hierarchy, each subscription corresponding to one or more grains included in the grain hierarchy, and each subscription specifying one or more actions to be performed by the hub device; and performing, during performance of the computation, at least one of the actions specified by at least one of the subscriptions.

20 Claims, 4 Drawing Sheets

MANAGING METADATA FOR A DISTRIBUTED PROCESSING SYSTEM WITH MANAGER AGENTS AND WORKER AGENTS

BACKGROUND

This specification relates to managing metadata in a distributed processing system.

Distributed processing systems are systems that include multiple data processors that can be assigned to perform various tasks, or processes. They may include, for example, thousands of data processors that are each capable of performing a number of different processes. Distributed processing systems may be used for processing large volumes of data and/or for processing continuous streams of data. The variety of computations capable of being performed by distributed processing systems has led to the development of many different tools for performing various tasks.

SUMMARY

In general, one innovative aspect of the subject matter described in this specification can be embodied in methods that include the actions of receiving, at a hub device that includes one or more data processing apparatus, a computation specification that includes a set of grains that specifies an initial state for a computation that is to be performed by a distributed processing system that includes a plurality of data processors, wherein each grain included in the set of grains comprises metadata that specifies a portion of the initial state for the computation; storing, by the hub device, a grain hierarchy that represents a state for the computation based on a grain type associated with each grain included in the set of grains, the grain hierarchy comprising subscription grains for one or more subscriptions for the grain hierarchy, each subscription corresponding to one or more grains included in the grain hierarchy, and each subscription specifying one or more actions to be performed by the hub device; and performing, by the hub device and during performance of the computation, at least one of the one or more actions specified by at least one of the one or more subscriptions. Other embodiments of this aspect include corresponding systems, apparatus, and computer programs, configured to perform the actions of the methods, encoded on computer storage devices.

These and other embodiments can each optionally include one or more of the following features. The grain hierarchy may comprise: one or more manager agent grains specifying metadata for one or more manager agent processes that manage the performance of the computation by the distributed processing system; one or more dataset grains including metadata for data accessible by the distributed processing system; one or more task grains including metadata for one or more tasks to be performed by the distributed processing system; or one or more worker agent grains including, for at least one of the one or more tasks, metadata for one or more worker agents that each correspond to a subset of the plurality of data processors for performing the task.

The computation specification may specify a subscribing agent for each of the one or more subscriptions for the grain hierarchy. Each subscribing agent may be a i) manager agent having a corresponding grain included in the grain hierarchy, or ii) a worker agent having a corresponding grain included in the grain hierarchy.

One of the one or more subscriptions may be an observe subscription that instructs the hub device to notify a subscribing agent of the observe subscription of a specified change in the portion of the state specified by the one or more grains of the grain hierarchy to which the observe subscription corresponds.

One of the one or more subscriptions may be a query subscription that instructs the hub device to, in response to receiving the query subscription, provide a subscribing agent of the query subscription with specific information associated with the portion of the state specified by the one or more grains of the grain hierarchy to which the query subscription corresponds.

One of the one or more subscriptions may be a claim subscription that instructs the hub device to assign ownership of a grain included in the one or more grains of the grain hierarchy to which the claim subscription corresponds.

The method may further comprise: receiving an additional grain for the computation; and storing the additional grain in the grain hierarchy for the computation.

The method may further comprise: monitoring the state for the computation by monitoring one or more changes to one or more of the grains included in the grain hierarchy during performance of the computation; and providing a subscribing agent a notification in response to detecting a particular change to a particular grain having a corresponding subscription subscribed to by the subscribing agent.

Each grain may specify one or more of: a name that describes a location of the grain within the grain hierarchy; a current state for the grain; an owner that owns the grain; an expiration time at which ownership of the grain will expire; statistics that include measurements for monitoring progress of the computation; restrictions on ownership of the grain; dependencies on other grains included in the grain hierarchy; or a timestamp, assigned by the hub device, indicating the most recent update to the grain.

The one or more actions to be performed by the hub device may include one or more of: providing a subscribing agent with a notification that a pre-specified event occurred in the one or more grains to which an observe subscription corresponds; assigning, to a subscribing agent, ownership of the one or more grains to which a claim subscription corresponds; updating a current state for one or more grains; or providing a subscribing agent with particular metadata included in the one or more grains to which a query subscription corresponds.

One or more of the manager agent processes may comprise: a launcher agent process that observes a worker agent grain sub-tree and launches processes; a matcher agent process that matches data to be processed by the distributed processing system to one or more of the worker agents; or a task shaper agent process that manages a task grain sub-tree.

Particular embodiments of the subject matter described in this specification can be implemented so as to realize one or more of the following advantages. Using a hub device for managing metadata for computations performed using a distributed processing system allows a large variety of computations to be performed using a common hub device. A common hub device can provide fault-tolerance, scheduling, worker management, and other features as needed by particular computations. Developers of tools that perform computations using a hub device avoid the need to develop many features common to the hub device, and the hub device also allows for developer customization when a computation requires it. In addition to management supported by the hub itself, connected agents can observe and update the metadata in the hub to provide additional management capabilities, such as customized scheduling, and worker management, to name a few.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
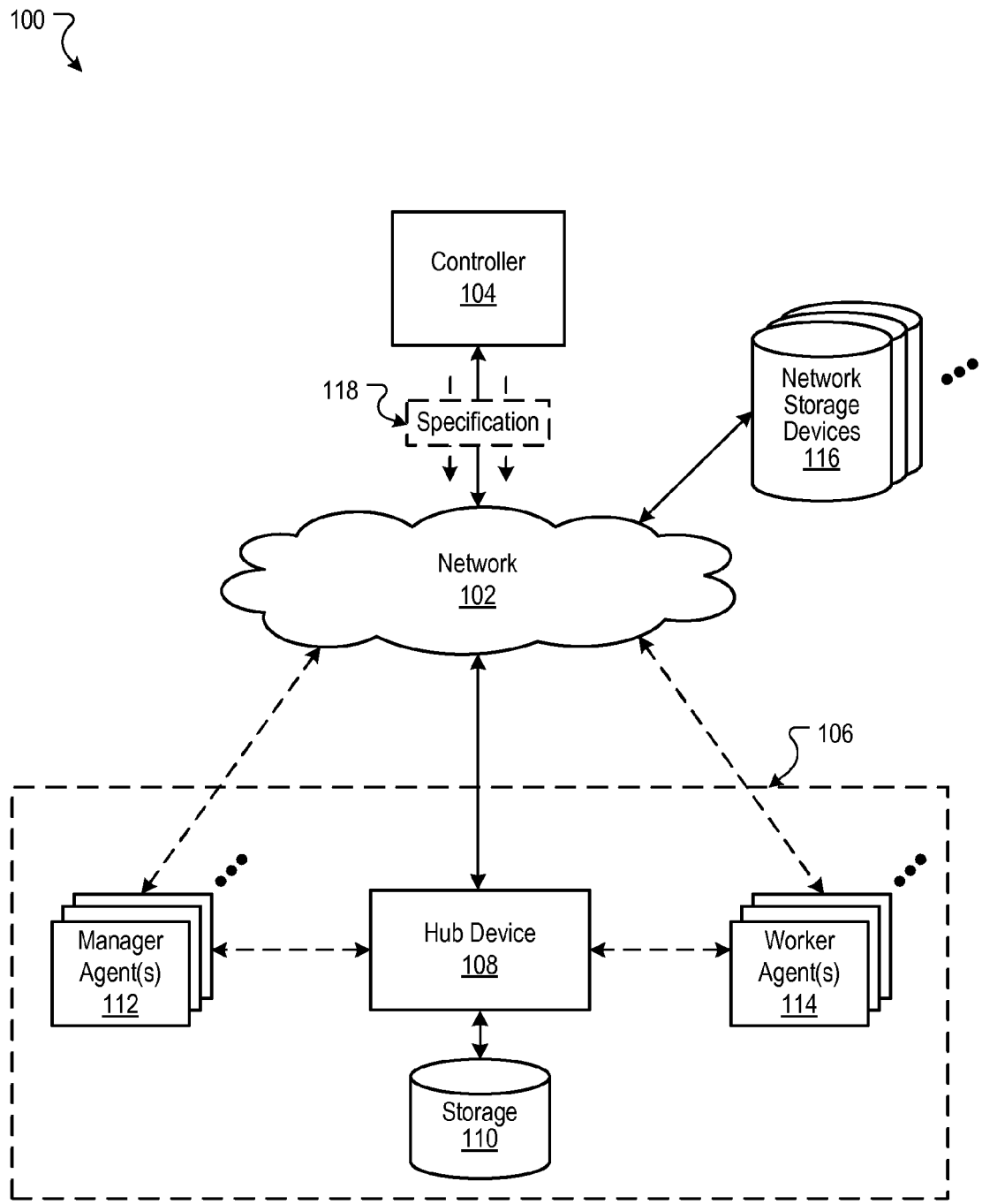
FIG. 1 is a block diagram of an example environment in which a hub device manages metadata for a distributed processing system.

A hub device facilitates the management of metadata for computations performed using a distributed processing system. In a distributed processing system implementing master-worker architecture, the traditional role of the master may be assumed by the hub device and manager agents. The hub device holds the metadata representing the state of a computation being performed by the system. The manager agents observe and update the state of the computation over time. Worker agents claim units of work from the hub device, carry out the data processing for the computation, and update the state of the computation over time.

A distributed processing system may include many data processors that can each be assigned the role of a worker or a manager, and may be used to perform a portion of a computation. The hub device stores the state of the computation and manages computation metadata in a manner designed to accommodate differences in metadata management requirements of various computations. One example computation may be a combination of filtering, sorting, and reporting processes that are performed on a constantly flowing stream of incoming data. Another example computation is a large scale graph processing algorithm that generates statistics and other information related to a data represented in a graph.

Manager agent roles assumed by data processors of the distributed processing system include, for example, a launcher agent that may launch other agents and processes to be performed by the system, a task shaper agent that splits tasks into subtasks for processing by worker agents, and a matcher agent that assigns tasks to worker agents. Worker agents perform the task(s) assigned by the matcher agent. Both manager and worker agents communicate with the hub device throughout the performance of a computation, e.g., issuing update requests specifying changes in, or queries regarding, the state of the computation.

The information stored in a hub for a computation may include several types of metadata that collectively comprise the state of the computation at any given time. The metadata is stored in a grain hierarchy, where each grain represents metadata that specifies a portion of the computation's state. For example, a task grain sub-tree may include grains for each task and sub-task included in the computation, and each grain represents metadata for the task or sub-task, such as the worker agent responsible for performing a particular sub-task, or the progress of a sub-task. The initial state of the computation is described by a specification that is provided by a controller, e.g., a computer that initiates the computation. Throughout the computation, grains may be added, modified, or removed from the hierarchy, reflecting changes in the state of the computation. For example, grains for tasks and/or sub-tasks that have been completed may be removed from the grain hierarchy, while grains for additional tasks or input data may be added to the hierarchy.

The agents performing the computation may express interest in metadata represented in the grain hierarchy, e.g., grains of a sub-tree, other agents, data sets, or task data, using subscriptions. A subscription specifies an interest in a subset of grains, which can include a single grain. A subscription's scope is established by its attachment point and depth, which specify the root of a sub-tree in the grain hierarchy and may limit the depth within that sub-tree covered by the subscription. By way of example, a matcher agent, which assigns grains ready for processing to agents capable of processing them, may have a subscription to observe a sub-tree of worker agents that are capable of performing a particular task. The hub device, on the basis of the subscription, provides updates to the matcher agent when changes occur in the specified sub-tree of worker agents, such as a worker agent's completion of a sub-task. Subscription grains may also be represented in the grain hierarchy, and can be added, for example, by the initial computation specification, or upon request from an agent.

Different computations implement different tasks, of different scope, with varying inputs and differing output, but the same hub device architecture can be used to manage the metadata of many different computations. The use of a hub device to store metadata for a distributed processing system provides the developers of tools that perform computations a flexible metadata management system capable of being used for a variety of new and existing data processing tools.

These features and additional features are described in more detail below.

FIG. 1 is a block diagram of an example environment 100 in which a hub device manages metadata for a distributed processing system. A computer network 102, such as a local area network (LAN), wide area network (WAN), the Internet, or a combination thereof, connects a controller 104 to a distributed processing system 106 that includes a hub device 108, manager agents 112, and worker agents 114. The example network 102 also connects network data storage devices 116 to the distributed processing system 106 and controller 104. While the controller 104 and network storage devices 116 are depicted separately from the distributed processing system 106, one or both may also be included within the distributed processing system 106. The distributed processing system 106 may also include additional components not depicted in the example environment 100, such as a management system/component for controlling the distributed processing system, or a dedicated load balancer for managing allocation of work within the distributed processing system 106.

The controller 104 provides a specification 118 to the distributed processing system 106. The controller 104 may be external to the distributed processing system 106, as depicted in the example environment 100, or within the distributed processing system 106. The specification 118 includes a set of grains that specify the initial state for a computation to be performed by the distributed processing system 106. In some implementations, the controller 104 is provided the specification by a third party, e.g., a developer or separate system used to interface with a user. The hub device 108 may receive the initial specification 118 in other ways, e.g., the initial specification 118 may be provided in instructions included in an application started on the distributed processing system 106, or may be retrieved from a network storage device 116.

The hub device 108 stores metadata for a computation in a grain hierarchy and supports updating the grains over time. The hub device 108 may be implemented, for example, on a server computer, and may include local or networked storage 110 for storing metadata for a particular computation. In some implementations, network storage devices 116 may be used by the hub device 108, either alone or in combination with storage 110. The hub device 108 is in communication with the manager agents 112 and worker agents 114 that, collectively, perform a computation. Communication between the hub device 108, storage 110, manager agents 112, and worker agents 114 may be, for example, any combination of direct communications, internal network communications, and/or communication across the network 102.

Manager agents 112 are components of the distributed processing system 106 that manage performance of a computation and interact with the hub device 108 to modify the state of the computation over time. Manager agents include, for example, a launcher agent that launches worker agents 114 when needed, and a matcher agent that matches units of work with worker agents 114. In implementations where the controller 104 is part of the distributed processing system 106, the controller 104 may be considered a manager agent.

Worker agents 114 are components of the distributed processing system 106 that perform part of a computation. Worker agents 114 also interact with the hub device 108 to modify the state of the computation over time. Worker agents may be implemented on one or more data processors of the distributed processing system 106 and can, in some implementations, be used to perform any task assigned to it by a manager agent. For example, a worker agent may manipulate streaming data or batches of data in a variety of ways, such as sorting data, shuffling records, moving data, filtering records, and generating output data.

Agents, both manager agents 112 and worker agents 114, may be implemented by a one or more data processors included in the distributed processing system 106. Additional data processors may be added and/or removed from the distributed processing system 106 as needed. In addition, an agent may have a dedicated data processor or pool of data processors for performing the agent's role for a computation. In some implementations, agents may be in communication with local storage devices, storage devices included in the distributed processing system, and/or networked storage devices 118. For example, a worker agent 114 that is performing a spam filter process on a batch of records may read the records from a networked storage device, use local storage to compare records to spam templates, and write output, e.g., a spam or no-spam label, to another networked storage device.

An example computation may begin by starting the hub device 108 and, optionally, a launcher agent (e.g., one of the manager agents 112) that will be responsible for starting up other agents on the basis of worker agent grains. This may be performed, for example, using a script. In some implementations the hub device 108 and all agents may be started at the beginning of the computation, e.g., by a script, obviating the need for a launcher agent unless worker agent grains are to be added to the computation over time.

The initial specification 118 for the computation may be provided to the hub device 108 by the controller 104. The specification 118 includes a set of grains that represent the initial state of the computation. For example, a controller for a computation that performs mapping and reducing functions on a batch of data may provide a specification that includes dataset grains representing the map input and reduce output, grains representing the map and reduce tasks, and one or more worker agent grains for workers capable of handling the map and reduce tasks, e.g., known as map workers and reduce workers. The hub device 108 represents the grains included in the specification 118 in a grain hierarchy, which is described in further detail below.

Manager agents 112 prepare grains to be claimed by worker agents 114. For example, a scheduler agent may decide when each phase or task of a computation should begin, an input splitter agent may divide input data into pieces, a task shaper agent may group the pieces of data into tasks to be carries out by worker agents, and a worker agent manager may provide signals to a cluster management agent or system that is capable of adding and/or removing the number of workers to accommodate demand for the computation. Other manager agents 112 may also be used to facilitate performance of a computation, and they can be varied, e.g., by developers, as needed to perform particular work.

Tasks and sub-tasks may be assigned to worker agents 112, e.g., by a matcher agent, on the basis of the workers' claim subscriptions. Subscriptions, described in greater detail below, specify an interest in a portion of the grain hierarchy. For example, a worker agent performing a sorting task may have a claim subscription that indicates an interest in receiving data to be sorted. A matcher agent can identify input data without an owner and assign it to the worker agent, assuming, for example, that the worker agent meets any requirements specified by the input data grain.

Worker agents 114 update the hub device 108 with their progress on tasks over time, and the hub device 108 may propagate and aggregate statistics, such as a measure of progress, up the grain hierarchy. As each task represented in a task grain sub-tree is completed, the hub device can update the state of the task grain to indicate that the task is done. In some implementations, grains specify dependencies that must be met before the grains may be claimed. For example, a sorting task may be dependent on a filtering process, and a grain for the filter process cannot be claimed until the sorting task is complete.

Grains representing new input to be processed, e.g., as in the case of a new source of input for a computation, or additional stages of the computation may be added to the hub device 108 over time, e.g., by the controller 104 based on external events, or as a result of the computation itself, as in an iterative computation. For computations that terminate, the controller 104, instructions for the computation, or other agent, may detect termination and begin shutdown of the data processing system. For example, a computation may be finished when state of the grain at the root of the task grain sub-tree is marked done by the hub device 108. Other computations, such as those performed on streaming data, may not have a specified end.

As mentioned above, the hub device 108 may operate in a variety of distributed processing system configurations, in addition to the configuration depicted in the example environment 100. The hub device 108 also supports a variety of computations and tasks, in addition to the example computations and tasks described above.

Figure 2:
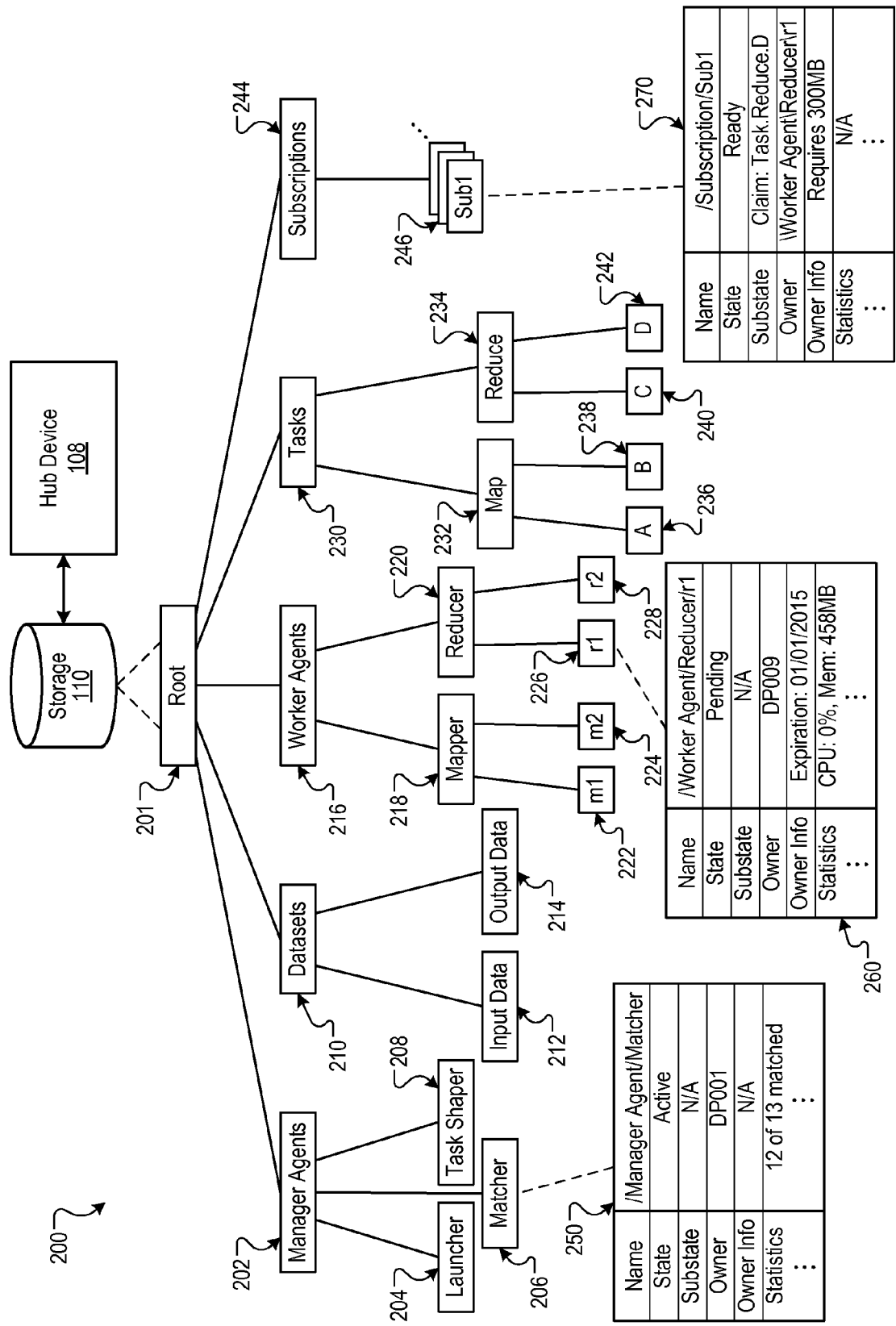
FIG. 2 is an illustration of an example grain hierarchy managed by a hub device.

FIG. 2 is an illustration of an example grain hierarchy 200, which is stored in storage 110 and managed by a hub device 108. The example grain hierarchy 200 represents the state of a computation by organizing grains in a tree structure, with the grains organized in sub-trees under a root node 201. In some implementations, grains may be represented on the wire, e.g., as in a wire protocol, and, as noted above, comprise metadata that describes the state of a portion of the computation. By way of example, a sort task performed by a distributed processing system may be divided into subtasks for processing by multiple workers, e.g., one sort subtask may be for sorting data records beginning with A-M, another subtask may be for sorting records beginning with N-Z, and a third subtask may be for sorting non-alphabetic data records. Metadata for the sort task, and each subtask, is stored in the grain hierarchy.

In some implementations, grains are generic data objects that may include metadata that is specific to the portion of the specification to which the grain corresponds. Each subtask grain may specify, for example, a status of the subtask, e.g., ready, active, or complete; an owner for the subtask, e.g., an identifier for the worker agent performing the subtask; and a progress for the subtask, e.g., a number or percentage of records that have been sorted, or a timestamp for a record currently being sorted. The task grain may include similar information for the task, and the progress for the task may be, for example, an aggregation or average of the progress of each subtask, or the timestamp of the oldest record currently being sorted.

The example grain hierarchy 200 includes a manager agents grain 202 that is the root of a manager agent sub-tree. The manager agents grain 202 includes metadata for the manager agents for a computation, such as the number and type of manager agents included in the sub-tree. The example manager agent sub-tree includes grains for three manager agents, a launcher grain 204, a matcher grain 206, and a task shaper grain 208. The launcher grain 204 may include, for example, metadata for a launcher agent that starts agent processes, including processes that create the hub device 108 and the other agents that are needed for a computation. The matcher grain 206 may include, for example, metadata for a matcher agent that observes grains ready for matching and matches the grains to available agents that are capable of processing them. The task shaper grain 208 may include, for example, metadata for a task shaper agent that may divide a grain representing a large task or phase of a computation into sub-tasks for processing by worker agents.

An example matcher grain 250 includes several fields, or categories, for metadata, such as a name field that indicates the name and path location of the matcher agent 206 and a state field that indicates that the matcher agent is currently "active," e.g., currently running on a data processor and actively matching worker agents and tasks. Other example fields include an owner field, which identifies the owner of the grain as the data processor running the matcher process, and a statistics field indicating that 12 of 13 tasks have been matched with worker agents. Other fields may be included in the matcher agent grain 206, and the same or different fields may be included in the launcher grain 204, task shaper grain 208, and manager agents grain 202.

The datasets grain 210 included in the example grain hierarchy 200 is the root of a datasets sub-tree. The datasets grain 210 includes metadata describing the state of computation data, such as the structure, type and location for input and/or output data. The example datasets sub-tree includes an input data grain 212 and an output data grain 214. The input data grain 212 may include, for example, metadata indicating a storage location or streaming source for input data, the format of the input data, and the quantity of input data for a computation. The output data grain 214 may include, for example, metadata indicating a storage location for output data and/or log data, as well as a format for the output data and a quantity of output data produced during the computation.

The worker agents grain 216 included in the example grain hierarchy 200 is the root of a worker agent sub-tree. The worker agents grain 216 includes metadata describing the state of the worker agents performing the computation, such as the types of worker agents, number of worker agents, and availability of worker agents. The example worker agent sub-tree includes a mapper grain 218 describing the state of worker agents performing a map function (e.g., map workers) and a reducer grain describing the state of worker agents performing a reduce function (e.g., reduce workers). The mapper grain 218 and reducer grain 220 may include metadata describing the state of the workers included in their respective sub-trees, such as the number of map workers pending a grain assignment and the number of workers currently performing the reduce function. Grains for individual workers performing the map function, e.g., m1 222 and m2 224, include metadata for the individual worker agents, as do grains for the workers currently designated for performing the reduce function, e.g., r1 226 and r2 228.

As with the example manager agent grain 250 described above, the example grain for the worker, r1 260, includes several fields, or categories, for metadata, such as a name field that indicates the name and path location of the worker and a state field that indicates that the worker is currently "pending," e.g., waiting to claim a reduce subtask. Other example fields include an owner field, which identifies the owner of the grain as the data processor running a reduce worker process, an owner information field indicating a time at which ownership will expire unless a lease is renewed by the owner, and a statistics field indicating system resources currently in use by the grain owner. Other fields may be included in the reducer worker grain, r1 226, and the same or different fields may be included in the matcher worker grains, m1 222 and m2 224, the matcher grain 218, the reducer grain 220, and the worker agents grain 216.

The example grain hierarchy 200 also includes a tasks grain 230 that forms the root of a task sub-tree. The tasks grain 230 includes metadata describing the state of the tasks to be performed (or being performed) during the course of the computation, such as the overall progress of the tasks to be performed and the overall number and type of tasks and subtasks. The example task sub-tree includes a map grain 232 describing the state of the map task and a reduce grain 234 describing the state of the reduce task. The map grain 232 and reduce grain 234 may include metadata describing the state of the tasks and/or the subtasks included in their respective sub-trees, such as the progress of the task, e.g., as an aggregation of sub-task progress, and number of sub-task grains waiting to be assigned an owner by the hub device 108 or a matcher agent. Grains for the individual sub-tasks, e.g., A 236, B 238, C 240, and D 242, include metadata for the respective sub-tasks, such as the identity of the grain owner and sub-task progress.

A subscriptions grain 244 is also included in the example grain hierarchy 200, and it forms the root of a subscription sub-tree. The subscriptions grain 244 includes metadata describing the state of subscriptions, such as the number and type of subscriptions. The example subscriptions sub-tree includes subscription grains 246 that each describe the state of a subscription. In some implementations, the subscription grains are not stored in a sub-tree of the grain hierarchy, but may instead be stored in a different portion of the grain hierarchy, e.g., with the subscribing agent, or in a data structure that is separate from the grain hierarchy.

As with the example manager agent grain 250 and the example reducer worker grain 260, the example subscription grain 270 includes several fields, or categories, for metadata, such as a name field that indicates the name and path location of the subscription and a state field that indicates that the subscription is currently "active," e.g., having subscriber. The substate field may specify additional information about a grain's state, such as information used to narrow subscriptions, e.g., a substate field for a dataset grain may specify that the size of the dataset in preparation is unknown until an agent has determined the dataset's size and updated the substate of the dataset to be in preparation but with a known size, which may be a condition for the dataset grain being claimed by another worker agent. The example substate field of the subscription grain specifies the type of subscription, e.g., a claim subscription for the reduce sub-task, D 242. The owner field identifies the subscriber of the grain as the reducer worker agent, r2 220, and the ownership info lists the requirements of ownership of the reduce sub-task, e.g., 300 MB of available memory. While subscriptions are described in further detail below, the example subscription grain 270 indicates that the reducer worker, r1 226, has a claim on the reduce sub-task, D 242, and the hub device 108 will assign ownership of the reduce sub-task to the reducer worker when a certain condition is met, such as a dependency on a map sub-task being completed, e.g., map sub-task B 238. Other fields may be included in the subscription grain 270, and the same or different fields may be included in other subscription grains.

As noted above, a subscription specifies an interest in a grain or subset of grains, and has a corresponding attachment point and depth in the grain hierarchy. While various types of subscriptions exist, each subscription specifies one or more actions to be performed by a hub device. For example, an observe subscription may be used to monitor the state of a computation over time and cause an agent to be notified about the new or current state of one or more grains when a condition is met. An example observe subscription may be subscribed to by a launcher agent to observe insertions and changes to a worker agents grain, e.g., worker agents grain 216, over time. When a new worker agent grain is inserted, the hub device will notify the launcher agent due to the observe subscription.

Another example subscription is a claim subscription, which expresses an interest in owning grains in a certain part of the grain hierarchy and results in a claim notification when an available grain is matched to the subscribing agent, subject to the agent's capabilities and the grain's ownership restrictions. The claim notification informs the subscribing agent that it has become the owner of a grain on the basis of the claim subscription. In some implementations, an agent can explicitly insert a grain and name itself as the owner without using a claim subscription.

A query subscription is used to look up the current state of one or more grains, as a direct query to the hub device. For example, upon receiving a claim notification for a task grain, a worker might use a query subscription to look up additional information in a dataset grain that is identified by the task grain as input. Another example subscription is an approve subscription, which provides an opportunity to prevent certain changes from happening. For example, a security manager may prevent insertion of a task that has sensitive logs as input and an output location in violation of a security policy, or a backup manager may prevent a backup worker from renewing ownership of a task grain if the primary task has already completed. Other types of subscriptions may also be stored in the grain hierarchy, including custom-made subscriptions developed for a particular computation. In some implementations, certain types of subscriptions may not persist within the grain hierarchy, e.g., a query subscription may be used once to query the hub and then be forgotten. In some implementations, certain types of subscriptions persist within the grain hierarchy, e.g., an approve subscription that causes notifications to be periodically provided to agents as the metadata of a computation changes over time.

In some implementations, subscriptions may be limited to certain types of grains, or grains with certain properties. For example, an observe subscription may specify that it is only interested in receiving notifications from the hub device for grains in a particular state. Another example subscription may specify that it would like to query only task and sub-task grains that indicate the corresponding task is more than 90% complete. Other limitations, or combinations of limitations, may also be used, such as a claim subscription for input data that matches a particular input type and that is less than a particular size.

The structure of the grain hierarchy may depend on the specification and the requirements of a particular computation. Other grain hierarchies may include more or less grains and sub-trees than those depicted in the example grain hierarchy 200. For example, a grain hierarchy may have multiple worker agent sub-trees, and manager agents may descend directly from the root node as opposed to a manager agents grain. In some implementations, subscriptions may be stored separately from the grain hierarchy, e.g., in a different data structure and/or location in the hub device's local storage. For example, if a computation calls for multiple task shaper agents, the task shaper grain 208 may be the root of a sub-tree for individual task shapers, and the subscriptions 246 may be organized into sub-trees according to subscription type, e.g., one sub-tree for each type.

The metadata included in each grain may also vary from the metadata included in the example grains of the example hierarchy 200. For example, the name for a grain may be unique identifier assigned by the hub device, or a combination of unique identifier and path. The grain state may vary depending on the portion of the computation to which the grain corresponds. For example, a task grain may have different options to describe its state than a dataset grain. Grain states may include a status code, such as any of the following: "absent," indicating that the grain is not yet, or no longer, in the hub, "prep," indicating that the grain is incomplete and still being prepared, "pending," indicating that the grain is waiting to be scheduled, "blocked," indicating that a grain cannot advance due to a dependency, "ready," indicating that the grain can be given an owner by the matcher agent, "assignable," indicating that the grain can be given an owner by the hub device, "active," indicating that the grain has an owner, "done," indicating that the processing of the grain has finished, "failed," indicating that processing of the grain terminate unsuccessfully, and "broken," indicating that the grain is improperly formed or can't be processed normally.

Another example grain field includes ownership information, which may describe restrictions on functional attributes and resources that must be provided by an agent in order to own the grain, dependencies on other grains that must be satisfied before the grain can be owned, and a time at which ownership of the grain will expire unless a lease is renewed. Other grain fields include a hub-assigned logical timestamp of the most recent update to the grain, status details, directives about propagation of completion up the grain hierarchy, and hints that may be modified by a non-owner of the grain.

Throughout a computation, the grain hierarchy may change. For example, grains and sub-trees may be inserted and removed by a controller agent, and the metadata within grains changes as the state of the computation changes. For example, computations that do not end, such as computations on streaming input data, may have an active datasets grain and sub-tree, with grains for new data being added, and grains for data on which processing has completed being constantly removed. The hub may also cause a controller agent to end processing for a computation, e.g., by sending a notification to the controller agent that the root of the task sub-tree has been marked completed by the hub.

Figure 3:
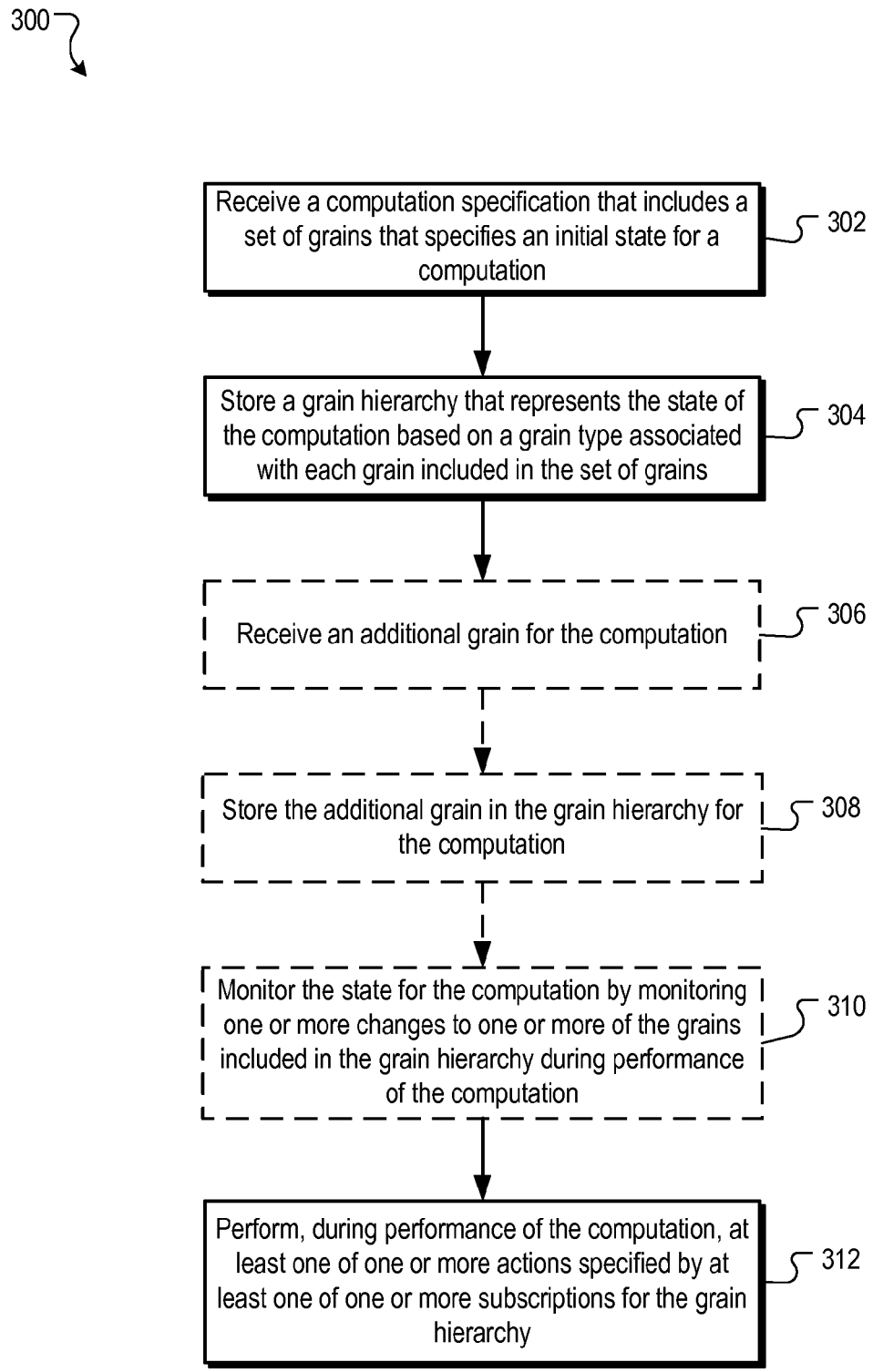
FIG. 3 is a flow diagram of an example process by which metadata is managed for a distributed processing system.

FIG. 3 is a flow diagram of an example process 300 by which metadata is managed for a distributed processing system. The process 300 may be performed by data processing apparatus, such as the hub device described above.

A computation specification that includes a set of grains that specifies an initial state for a computation that is to be performed by a distributed processing system is received at a hub device (302). The distributed processing system includes a plurality of data processors, and each grain included in the set of grains includes metadata that specifies a portion of the state for the computation. For example, a controller agent for a computation that performs a filtering and sorting process on a set of input data may provide a specification to a hub device. The specification may include grains for the filtering task and sorting task, as well as grains for workers to perform the filter process. If, by way of example, the sorting process is dependent on the filtering process, the grains included in the specification may not include grains for workers to perform the sorting process, as they are not needed for the initial phase of the computation.

A grain hierarchy that represents the state for the computation based on a grain type associated with each grain included in the set of grains is stored by the hub device (304). The grain hierarchy may include subscription grains for zero or more subscriptions for the grain hierarchy, each subscription corresponding to zero or more grains included in the grain hierarchy, and each subscription specifying one or more actions, e.g., observe and/or claim, to be performed by the hub device.

In some implementations, one of the subscriptions is an observe subscription that instructs the hub device to notify a subscriber of the observe subscription of a specified change in the portion of the state specified by the one or more grains of the grain hierarchy to which the observe specification corresponds. For example, a launcher agent may have an observe subscription on a task grain for a filtering task, the hub device may notify the launcher agent regarding updates to the filtering task, and the launcher agent may use the information to start workers for a subsequent sorting task that depends on the filtering task.

In some implementations, one of the one or more subscriptions is a query subscription that instructs the hub device to, in response to receiving the query subscription, provide a subscriber of the query subscription with specific information associated with the portion of the state specified by the one or more grains of the grain hierarchy to which the query subscription corresponds. For example, a manager agent that reports the completion status of a task upon user demand may issue a query to the hub device for the progress of a particular task.

In some implementations, one of the one or more subscriptions is a claim subscription that instructs the hub device to assign ownership of a grain included in the one or more grains of the grain hierarchy to which the claim subscription corresponds. For example, a worker agent may issue a claim subscription to the hub device for a particular task or subtask, and the hub device will assign ownership of the task grain to the worker agent.

In some implementations, the grain hierarchy includes one or more manager agent grains specifying metadata for one or more manager agent processes for managing the performance of the computation by the distributed processing system. For example, data processors that are performing processes that manage the computation being performed by the distributed processing system have their own metadata and their own portion of the grain hierarchy where this metadata is stored. Metadata for a load balancing agent may, for example, include data indicating the progress of each worker agent in the distributed processing system. In some implementations, one or more of the manager agent processes include: a launcher agent process that observes a worker agent grain sub-tree and launches processes; a matcher agent process that matches data to be processed by the distributed processing system to one or more of the worker agents; or a task shaper agent process that manages a task grain sub-tree.

The grain hierarchy may also include one or more dataset grains including metadata for data accessible by the distributed processing system. This may include, for example, grains for input data, output data, and log data, which may include metadata such as the location of the log data, the amount of output data, and the type(s) of input data.

The grain hierarchy may also include one or more task grains including metadata for one or more tasks to be performed by the distributed processing system. For example, a computation that involves a sort process and a filter process may have a task grain for each process. In some implementations, each task grain is the root of a sub-tree for sub-tasks that are part of the task. For example, a filtering task may include subtasks for filtering different types of input data.

The grain hierarchy may also include one or more worker agent grains including, for at least one task, metadata for one or more worker agents that each correspond to a subset of the data processors for performing the task. Using the example computation involving a sort and filter task, a worker agent grain sub-tree may include one grain for filtering worker agents, which may form the root of a sub-tree that includes the grains for the data processors performing the filter process, and another grain for sorting worker agents, which may form the root of a sub-tree that includes the grains for the data processors performing the sort process.

In some implementations, the computation specification specifies a subscribing agent for each of the one or more subscriptions for the hierarchy of grains. For example, a launcher agent observing a particular task grain may be specified as the subscriber of the observe subscription that causes the hub device to observe the task grain on the launcher agent's behalf. In some implementations, each subscribing agent is i) a manager agent having a corresponding grain included in the manager agent sub-tree, or ii) a worker agent having a corresponding grain included in the worker agent sub-tree. In this implementation, subscriptions are subscribed to by only worker agents or manager agents.

In some implementations, an additional grain is received for the computation (306). For example, additional worker agents may be added to by a launcher agent or load balancer agent. Additional grains may be inserted in multiple ways, e.g., based on the computation instructions, manager agent insertions, user input, and arrival of additional data to be processed.

In some implementations, the additional grain is stored in the grain hierarchy for the computation (308). As noted above, grains may be introduced to the computation in multiple ways, and received grains can be added to the grain hierarchy by the hub device upon receipt of the grain.

In some implementations, the state for the computation is monitored by monitoring one or more changes to one or more of the grains included in the grain hierarchy during performance of the computation (310). While the specification describes the initial state of the computation, as the computation progresses, the data included in the grains of the grain hierarchy may be updated by agents performing the computation, and these changes result in changes in the state of the computation. The modifications to the grain hierarchy may be reported to and/or observed by the hub device during the computation, and the hub device may aggregate, track, and manage the metadata as the computation progresses. For example, the hub device may periodically aggregate statistics fields for task grains of tasks currently being performed to track the progress of the tasks. Using progress information reported by various filter agents performing a filtering task, for example, the hub device may update overall filter task progress from 50% complete to 75% complete, reflecting a change in the state of the computation.

In some implementations, monitoring changes includes receiving and handling updates to grains in the grain hierarchy. For example, the hub device may receive updated information about an existing grain and merge that information with the existing grain in the grain hierarchy. In addition, the hub device may, in some implementations, receive a new version of an existing grain and replace the existing grain with the new version.

During the performance of the computation, the hub device performs at least one of the actions specified by the subscriptions for the grain hierarchy (312). In some implementations, the one or more actions include: providing a subscribing agent with a notification that a pre-specified event occurred in the one or more grains to which an observe subscription corresponds, assigning, to a subscribing agent, ownership of the one or more grains to which a claim subscription corresponds; updating a current state for one or more grains; or providing a subscribing agent with particular metadata included in the one or more grains to which a query subscription corresponds. For example, a matcher agent may be the subscriber of an observe subscription that causes the hub device to observe a filtering task and notify the matcher agent when the filtering task is complete. The action specified by the observe subscription is a notification to the subscriber. As another example, a claim subscription may cause the hub device to take the action of assigning ownership of one grain to another grain, as in the case of a sorting worker agent with a claim subscription for a sorting task.

Figure 4:
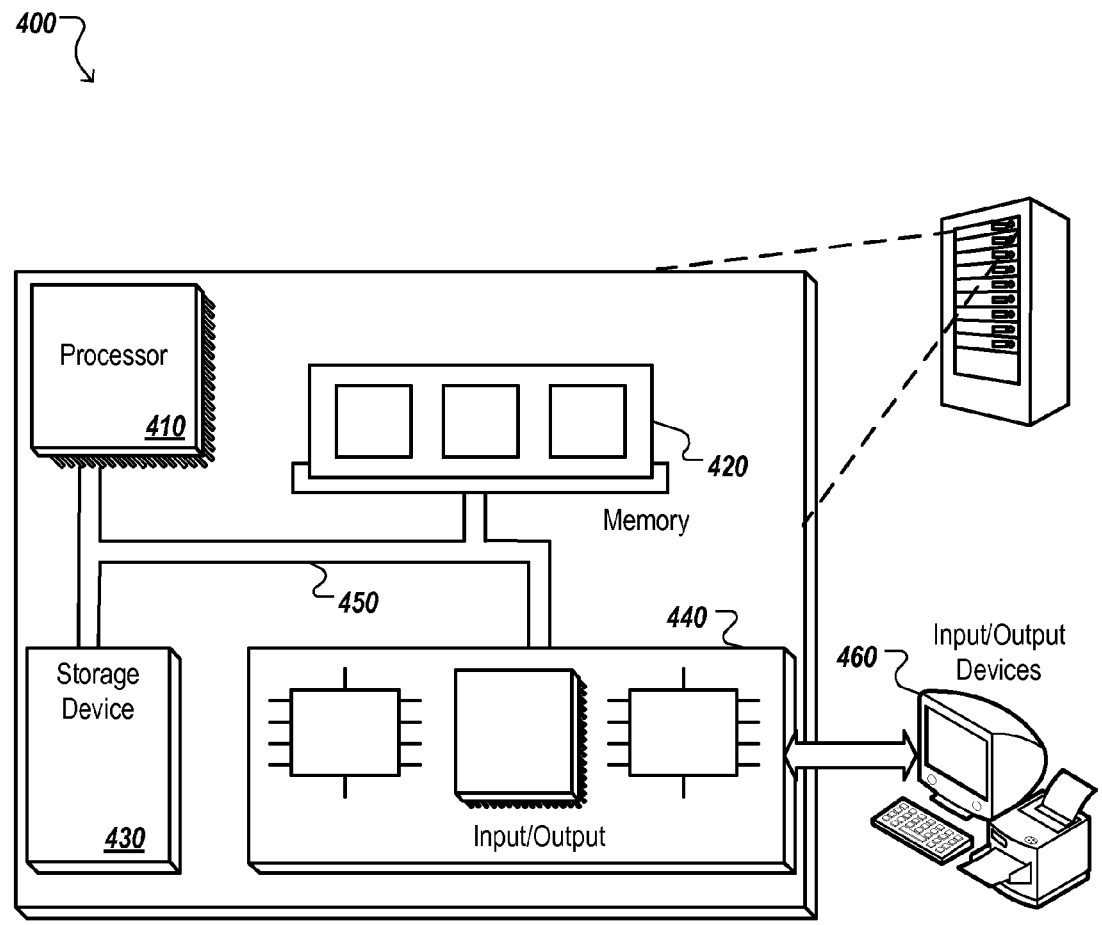
FIG. 4 is a block diagram of an example data processing apparatus.

FIG. 4 is a block diagram of an example data processing apparatus 400. The system 400 includes a processor 410, a memory 420, a storage device 430, and an input/output device 440. Each of the components 410, 420, 430, and 440 can, for example, be interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can, for example, include a hard disk device, an optical disk device, or some other large capacity storage device.

The input/output device 440 provides input/output operations for the system 400. In one implementation, the input/output device 440 can include one or more network interface devices, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:

receiving, at a hub device that includes one or more data processing apparatus, a computation specification that includes a set of grains that specifies an initial state for a computation that is to be performed by a distributed processing system that includes a plurality of data processors, wherein each grain included in the set of grains comprises metadata that specifies a portion of the initial state for the computation;

storing, by the hub device, a grain hierarchy that represents a state for the computation based on a grain type associated with each grain included in the set of grains, the grain hierarchy comprising subscription grains for one or more subscriptions for the grain hierarchy, each subscription corresponding to one or more grains included in the grain hierarchy, and each subscription specifying one or more actions to be performed by the hub device; and performing, by the hub device and during performance of the computation, at least one of the one or more actions specified by at least one of the one or more subscriptions;

wherein the grain hierarchy comprises:

one or more manager agent grains specifying metadata for one or more manager agent processes that manage the performance of the computation by the distributed processing system; and one or more worker agent grains including, for at least one of one or more tasks to be performed by the distributed processing system, metadata for one or more worker agents that each correspond to a subset of the plurality of data processors for performing the task.

2. The method of claim 1, wherein the grain hierarchy further comprises:

one or more dataset grains including metadata for data accessible by the distributed processing system; and one or more task grains including metadata for the one or more tasks to be performed by the distributed processing system.

3. The method of claim 2, wherein the computation specification specifies a subscribing agent for each of the one or more subscriptions for the grain hierarchy.

4. The method of claim 3, wherein each subscribing agent is a i) manager agent having a corresponding grain included in the grain hierarchy, or ii) a worker agent having a corresponding grain included in the grain hierarchy.

5. The method of claim 1, wherein one of the one or more subscriptions is an observe subscription that instructs the hub device to notify a subscribing agent of the observe subscription of a specified change in the portion of the state specified by the one or more grains of the grain hierarchy to which the observe subscription corresponds.

6. The method of claim 1, wherein one of the one or more subscriptions is a query subscription that instructs the hub device to, in response to receiving the query subscription, provide a subscribing agent of the query subscription with specific information associated with the portion of the state specified by the one or more grains of the grain hierarchy to which the query subscription corresponds.

7. The method of claim 1, wherein one of the one or more subscriptions is a claim subscription that instructs the hub device to assign ownership of a grain included in the one or more grains of the grain hierarchy to which the claim subscription corresponds.

8. The method of claim 1, further comprising:
receiving an additional grain for the computation; and
storing the additional grain in the grain hierarchy for the computation.

9. The method of claim 1, further comprising:
monitoring the state for the computation by monitoring one or more changes to one or more of the grains included in the grain hierarchy during performance of the computation; and
providing a subscribing agent a notification in response to detecting a particular change to a particular grain having a corresponding subscription subscribed to by the subscribing agent.

10. The method of claim 1, wherein each grain specifies one or more of:

a name that describes a location of the grain within the grain hierarchy;
a current state for the grain;
an owner that owns the grain;
an expiration time at which ownership of the grain will expire;
statistics that include measurements for monitoring progress of the computation;
restrictions on ownership of the grain;
dependencies on other grains included in the grain hierarchy; or
a timestamp, assigned by the hub device, indicating the most recent update to the grain.

11. The method of claim 1, wherein the one or more actions to be performed by the hub device include one or more of:
providing a subscribing agent with a notification that a pre-specified event occurred in the one or more grains to which an observe subscription corresponds;
assigning, to a subscribing agent, ownership of the one or more grains to which a claim subscription corresponds;
updating a current state for one or more grains; or
providing a subscribing agent with particular metadata included in the one or more grains to which a query subscription corresponds.

12. The method of claim 1, wherein one or more of the manager agent processes comprises:
a launcher agent process that observes a worker agent grain sub-tree and launches processes;
a matcher agent process that matches data to be processed by the distributed processing system to one or more of the worker agents; or
a task shaper agent process that manages a task grain sub-tree.

13. A system comprising:
a hub device comprising one or more data processing apparatus; and
a data store storing instructions that, when executed by the hub device, cause the hub device to perform operations comprising:
receiving, at the hub device, a computation specification that includes a set of grains that specifies an initial state for a computation that is to be performed by a distributed processing system that includes a plurality of data processors, wherein each grain included in the set of grains comprises metadata that specifies a portion of the initial state for the computation;
storing, by the hub device, a grain hierarchy that represents a state for the computation based on a grain type associated with each grain included in the set of grains, the grain hierarchy comprising subscription grains for one or more subscriptions for the grain hierarchy, each subscription corresponding to one or more grains included in the grain hierarchy, and each subscription specifying one or more actions to be performed by the hub device; and
performing, by the hub device and during performance of the computation, at least one of the one or more actions specified by at least one of the one or more subscriptions;
wherein the grain hierarchy comprises:
one or more manager agent grains specifying metadata for one or more manager agent processes that manage the performance of the computation by the distributed processing system; and
one or more worker agent grains including, for at least one of one or more tasks to be performed by the distributed processing system, metadata for one or more worker agents that each correspond to a subset of the plurality of data processors for performing the task.

14. The system of claim 13, wherein the grain hierarchy further comprises:
one or more dataset grains including metadata for data accessible by the distributed processing system; and
one or more task grains including metadata for the one or more tasks to be performed by the distributed processing system.

15. The system of claim 14, wherein the computation specification specifies a subscribing agent for each of the one or more subscriptions for the grain hierarchy.

16. The system of claim 15, wherein each subscribing agent is a i) manager agent having a corresponding grain included in the grain hierarchy, or ii) a worker agent having a corresponding grain included in the grain hierarchy.

17. The system of claim 13, wherein one of the one or more subscriptions is an observe subscription that instructs the hub device to notify a subscribing agent of the observe subscription of a specified change in the portion of the state specified by the one or more grains of the grain hierarchy to which the observe subscription corresponds.

18. The system of claim 13, wherein one of the one or more subscriptions is a query subscription that instructs the hub device to, in response to receiving the query subscription, provide a subscribing agent of the query subscription with specific information associated with the portion of the state specified by the one or more grains of the grain hierarchy to which the query subscription corresponds.

19. The system of claim 13, wherein one of the one or more subscriptions is a claim subscription that instructs the hub device to assign ownership of a grain included in the one or more grains of the grain hierarchy to which the claim subscription corresponds.

20. A non-transitory computer readable medium storing instructions that, when executed by a hub device comprising one or more data processing apparatus, cause the hub device to perform operations comprising:
receiving, at the hub device, a computation specification that includes a set of grains that specifies an initial state for a computation that is to be performed by a distributed processing system that includes a plurality of data processors, wherein each grain included in the set of grains comprises metadata that specifies a portion of the initial state for the computation;
storing, by the hub device, a grain hierarchy that represents a state for the computation based on a grain type associated with each grain included in the set of grains, the grain hierarchy comprising subscription grains for one or more subscriptions for the grain hierarchy, each subscription corresponding to one or more grains included in the grain hierarchy, and each subscription specifying one or more actions to be performed by the hub device; and
performing, by the hub device and during performance of the computation, at least one of the one or more actions specified by at least one of the one or more subscriptions;
wherein the grain hierarchy comprises:
one or more manager agent grains specifying metadata for one or more manager agent processes that manage the performance of the computation by the distributed processing system; and
one or more worker agent grains including, for at least one of one or more tasks to be performed by the distributed processing system, metadata for one or more worker agents that each correspond to a subset of the plurality of data processors for performing the task.

* * * * *